No. 691,743. Patented Jan. 28, 1902.
G. J. CAPEWELL.
METALLIC GARMENT BUTTON.
(Application filed Apr. 2, 1901.)
(No Model.)
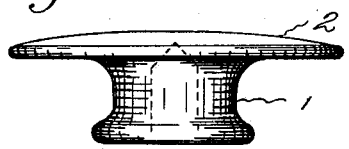
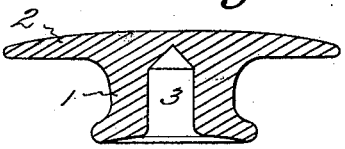
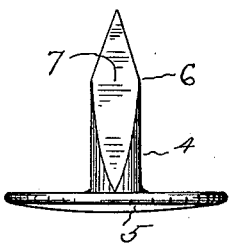
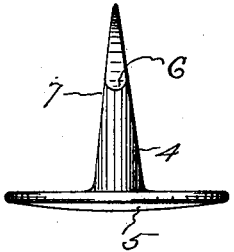
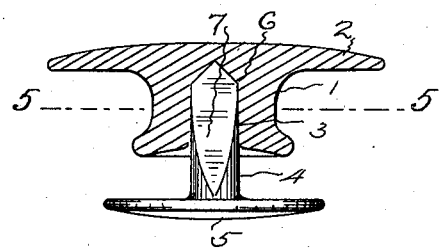
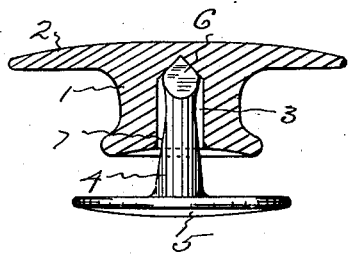
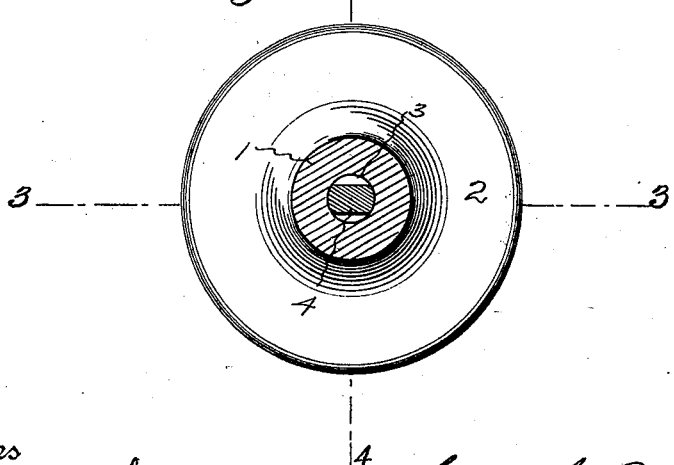
Witnesses
V. R. Holcomb.
C. F. Kilgore
Inventor
George J. Capewell, by
Harry P. Williams.
Attorney

UNITED STATES PATENT OFFICE.

GEORGE J. CAPEWELL, OF HARTFORD, CONNECTICUT.

METALLIC GARMENT-BUTTON.

SPECIFICATION forming part of Letters Patent No. 691,743, dated January 28, 1902.

Application filed April 2, 1901. Serial No. 54,031. (No model.)

*To all whom it may concern:*

Be it known that I, GEORGE J. CAPEWELL, a citizen of the United States, residing at Hartford, in the county of Hartford and State of Connecticut, have invented certain new and useful Improvements in Metallic Garment-Buttons, of which the following is a specification.

This invention relates to those buttons that are particularly adapted for permanent attachment to trousers, overalls, weather-coats, and the like, which are formed of heads with tubular shanks that are intended to be located on the outer sides of the garments and fasteners that are intended to be located on the inner sides and have their stems thrust through the garments into the openings in the tubular shanks of the heads on the outer sides of the garments.

The object of this invention is to so shape and proportion the stem of the fastener with relation to the opening in the shank of the head of a simple button of this nature that the fastener-stem may be easily thrust through the garment and readily driven into the head-shank and caused to engage the walls of the opening in such manner that great force will be required to separate the fastener from the head after they have once been put together.

The button that is illustrated by the accompanying drawings as embodying this invention has a circular head with a shank having an opening that is circular in cross-section and has a fastener with a stem that tapers to a point in two planes at right angles with each, one taper of the stem being quicker than the other and the widest diameter of the portion of the stem that enters the shank being substantially the same as the diameter of the opening, while the cross-sectional area of the portion of the stem that enters the shank is somewhat less than the cross-sectional area of the opening.

Figure 1 of the drawings shows a side view of the head and fastener of the button separated. Fig. 2 shows a sectional view of the head and a view of a different side of the fastener separated. Fig. 3 shows a sectional view of the head on the plane indicated by the broken line 3 3 of Fig. 5 and a side view of the fastener with the stem driven into the shank. Fig. 4 shows a sectional view of the head on the plane indicated by the broken line 4 4 of Fig. 5 and a view of a different side of the fastener with the stem driven into the shank, and Fig. 5 shows a section across the shank and stem on the plane indicated by the broken line 5 5 of Fig. 3.

The shank 1 of the button that is shown in the views is formed integral with the head 2. These parts could be formed of separate pieces, if desired. The opening 3 in the shank is circular in cross-section and may be made with a common drill. The stem 4 is formed integral with the fastener-disk 5; but of course these parts could be formed of separate pieces without departing from the invention. The stem is shown as having a quick taper to the point in one plane, Fig. 1, and as having a longer taper in the plane at right angles to the plane of the quick taper, Fig. 2. The widest diameter of the portion of the stem that is to enter the opening in the shank, as at 6, is substantially the same as the diameter of the opening, although of course it could be a little greater or very slightly less than the diameter of the opening without affecting the invention. The narrowest diameter of the portion of the stem that is to enter the opening in the shank, as at 7, is somewhat less than the diameter of the opening. By reason of this shape the cross-sectional area of the stem is somewhat less than the cross-sectional area of the opening, and when the stem is thrust into the shank it will bind against the walls of the opening on two sides only, as shown in Fig. 5. The pointed stem of this fastener may be easily thrust through the material of a garment and pushed into the opening in the shank of the button on the opposite side. When the stem of this fastener is driven into the shank, the point engages the tapering end of the opening and is not curved around or bent over, as is the end of the stem of the fastener illustrated and described in Patent No. 619,277, issued to myself February 14, 1899, but is upset—that is, the end of the stem is thickened out. The thickening of the inner end as the stem is driven in causes the two sides of the stem that are in engagement with the walls of the opening to become expanded very tightly against the walls of the opening. This causes the walls of the shank to become slightly expanded within the elasticity of the thick metal in one plane, so that the compressional strain of the metal of the shank will bind the shank to the stem very tightly. The frictional hold of these parts is not due to any bending over of the end of the stem nor to the forming of a head upon the end of the stem, but to the compressional strains produced by the stretching of the shank in one plane after the manner set forth in Patent No. 487,344, issued to myself December 6, 1892.

The stem of the fastener shown and described will not bend when driven in, but will upset and cause such an expansion of the metal against the sides of the shank that the binding of the solid metal shank against the sides of the stem is very powerful—in fact, much more powerful than if the stem fitted the opening on all sides and was simply driven into place with a tight fit. Effecting the expansion of the stem against the walls of the shank in one plane only causes the shank to bind the stem with such force that it is almost impossible to separate the parts.

I claim as my invention—

A button, consisting of a head with a tubular shank, and a fastener with a stem having a circular base substantially the same in diameter as the interior diameter of the shank and tapering uniformly on two sides from the head to the point which is adapted to engage the inner end of the opening in the shank, and extending on the two sides substantially at right angles thereto, the same diameter as the interior diameter of the shank for more than one-half the distance from the head to the point and then tapering sharply to the point so that the portion of the stem that enters the shank in one plane is substantially the same as the interior diameter of the shank-opening while in a plane at right angles thereto the portion of the stem that enters the shank is considerably less than the interior diameter of the shank, whereby the stem that is expanded in the shank will bind more forcibly against the walls of the opening in one plane than against the walls of the opening in a plane at right angles thereto, substantially as specified.

GEORGE J. CAPEWELL.

Witnesses:
H. R. WILLIAMS,
V. R. HOLCOMB.